(12) United States Patent
Liu et al.

(10) Patent No.: US 11,169,792 B2
(45) Date of Patent: Nov. 9, 2021

(54) METHOD AND APPARATUS FOR GENERATING PATCH

(71) Applicant: BEIJING BAIDU NETCOM SCIENCE AND TECHNOLOGY CO., LTD., Beijing (CN)

(72) Inventors: Qi Liu, Beijing (CN); Yu Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 33 days.

(21) Appl. No.: 16/133,436

(22) Filed: Sep. 17, 2018

(65) Prior Publication Data

US 2019/0146777 A1 May 16, 2019

(30) Foreign Application Priority Data

Nov. 13, 2017 (CN) .......................... 201711115857.8

(51) Int. Cl.
| | | |
|---|---|---|
| *G06F 8/71* | (2018.01) | |
| *G06F 8/65* | (2018.01) | |
| *G06F 9/445* | (2018.01) | |
| *G06F 9/4401* | (2018.01) | |
| *G06F 8/658* | (2018.01) | |
| *G06F 40/157* | (2020.01) | |
| *G06F 8/41* | (2018.01) | |

(52) U.S. Cl.
CPC ................ *G06F 8/65* (2013.01); *G06F 8/658* (2018.02); *G06F 9/4418* (2013.01); *G06F 9/44521* (2013.01); *G06F 40/157* (2020.01); *G06F 8/41* (2013.01)

(58) Field of Classification Search
CPC .......... G06F 8/65; G06F 8/658; G06F 40/157; G06F 9/4418; G06F 9/44521; G06F 8/41; G06F 8/71; H04L 67/34
See application file for complete search history.

(56) References Cited

U.S. PATENT DOCUMENTS 5,619,698 A * 4/1997 Lillich ...................... G06F 8/65
717/168
6,226,650 B1 * 5/2001 Mahajan ................. G06F 16/27
707/625

(Continued)

FOREIGN PATENT DOCUMENTS

| CN | 101004681 | 7/2007 |
|---|---|---|
| CN | 102609241 A | 7/2012 |

(Continued)

*Primary Examiner* — Chat C Do
*Assistant Examiner* — Noor Alkhateeb
(74) *Attorney, Agent, or Firm* — Knobbe, Martens, Olson & Bear, LLP

(57) ABSTRACT

Embodiments of the disclosure disclose a method and apparatus for generating a patch file. A specific embodiment of the method comprises: acquiring a first target file for establishing a target process, the first target file comprising a first symbol table; acquiring a second target file compiled based on a target source code file, the second target file comprising a second symbol table; determining a difference symbol between the first target file and the second target file using the first symbol table and the second symbol table; and generating a patch file based on the difference symbol. The embodiment has enriched the way to generate a patch file.

15 Claims, 6 Drawing Sheets

(56) References Cited

U.S. PATENT DOCUMENTS

| | | | | |
|---|---|---|---|---|
| 8,468,516 | B1* | 6/2013 | Chen | G06F 8/656 717/170 |
| 2002/0087956 | A1* | 7/2002 | Darlet | G06F 9/44521 717/159 |
| 2005/0282533 | A1* | 12/2005 | Draluk | G06F 8/60 455/418 |
| 2006/0106888 | A1* | 5/2006 | Iida | G06F 40/194 |
| 2007/0253027 | A1* | 11/2007 | Hiebert | G06F 40/174 358/1.18 |
| 2009/0006809 | A1* | 1/2009 | Blinick | G06F 9/44505 712/30 |
| 2010/0161732 | A1* | 6/2010 | Morris | H04L 29/12066 709/206 |
| 2012/0011512 | A1* | 1/2012 | Peckham | G06F 9/44521 718/100 |
| 2013/0042225 | A1* | 2/2013 | Wu | G06F 9/44536 717/165 |
| 2014/0270364 | A1 | 9/2014 | Baranowski | |
| 2016/0188316 | A1* | 6/2016 | Liang | H04L 67/34 717/169 |
| 2016/0188388 | A1* | 6/2016 | Chan | G06F 9/542 719/318 |
| 2017/0139778 | A1* | 5/2017 | Kito | G06F 8/66 |
| 2018/0011996 | A1* | 1/2018 | Dolev | G06F 21/75 |
| 2018/0349193 | A1* | 12/2018 | Zhang | G06F 8/654 |
| 2019/0068640 | A1* | 2/2019 | Araujo | G06F 21/566 |
| 2019/0324740 | A1* | 10/2019 | Fox | B60W 50/0225 |
| 2020/0242274 | A1* | 7/2020 | Pan | G07G 1/14 |

FOREIGN PATENT DOCUMENTS

| | | |
|---|---|---|
| CN | 103019787 A | 4/2013 |
| CN | 103559449 A | 2/2014 |
| CN | 104035772 A | 9/2014 |

* cited by examiner

METHOD AND APPARATUS FOR GENERATING PATCH

CROSS-REFERENCE TO RELATED APPLICATIONS

This application is related to and claims priority from Chinese Application No. 201711115857.8, filed on Nov. 13, 2017 and entitled "Method and Apparatus for Generating Patch," the entire disclosure of which is hereby incorporated by reference.

TECHNICAL FIELD

Embodiments of the disclosure relate to the field of computer technology, specifically to the field of Internet technology, and more specifically to a method and apparatus for generating a patch.

BACKGROUND

In the field of computers, after the program is released, errors may be discovered in the program over time. When this happens, it is necessary to revise the program or process using the patch file.

The existing methods for generating the patch file usually involve manually compiling the patch file by the programmers.

SUMMARY

Embodiments of the disclosure present a method and apparatus for generating a patch.

In a first aspect, an embodiment of the disclosure provides a method for generating a patch. The method includes: acquiring a first target file for establishing a target process, the first target file including a first symbol table; acquiring a second target file compiled based on a target source code file, the second target file including a second symbol table; determining a difference symbol between the first target file and the second target file using the first symbol table and the second symbol table; and generating a patch file based on the difference symbol.

In a second aspect, an embodiment of the disclosure provides an apparatus for generating a patch. The apparatus includes: a first acquiring unit, for acquiring a first target file for establishing a target process, the first target file including a first symbol table; a second acquiring unit, for acquiring a second target file compiled based on a target source code file, the second target file including a second symbol table; a determining unit, for determining a difference symbol between the first target file and the second target file using the first symbol table and the second symbol table; and a generating unit, for generating a patch file based on the difference symbol.

In a third aspect, an embodiment of the disclosure provides an electronic device, the electronic device including: one or more processors; and a memory for storing one or more programs, where the one or more programs enable, when executed by the one or more processors, the one or more processors to implement the method according to the first aspect.

In a fourth aspect, an embodiment of the disclosure provides a computer readable storage medium storing a computer program therein, where the program implements, when executed by a processor, the method according to the first aspect.

The method and apparatus for generating a patch provided by embodiments of the disclosure acquire a first target file for establishing a target process, the first target file including a first symbol table; acquire a second target file compiled based on a target source code file, the second target file including a second symbol table; determine a difference symbol between the first target file and the second target file using the first symbol table and the second symbol table; and generate a patch file based on the difference symbol, thereby enriching the way to generate a patch file.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
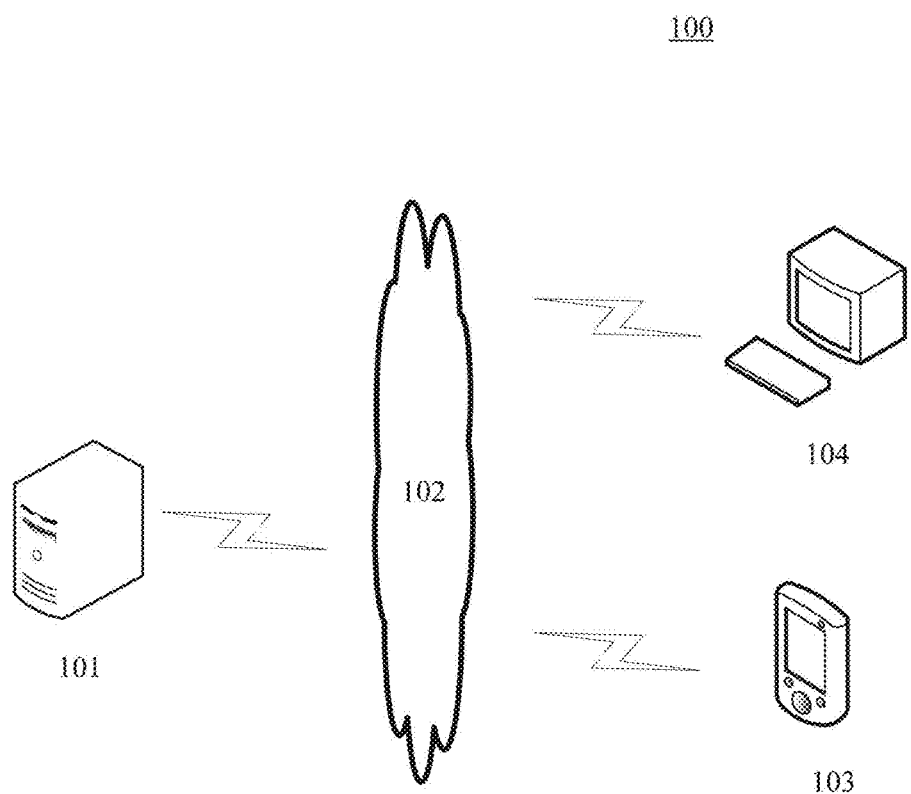
FIG. 1 is an architectural diagram of a system in which some embodiments of the present disclosure may be implemented.

FIG. 1 shows an architecture of a system 100 which may be used by a method for generating a patch or an apparatus for generating a patch according to the embodiments of the present disclosure.

As shown in FIG. 1, the system architecture 100 may include a server 101, a network 102, and terminal devices 103 and 104. The network 102 serves as a medium providing a communication link between the server 101 and the terminal devices 103 and 104. The network 102 may include various types of connections, such as wired or wireless transmission links, or optical fibers.

The user may use the terminal devices 103 and 104 to interact with the server 101 through the network 102, to receive or transmit messages. Various client applications, such as webpage browsers, shopping applications, search applications, instant messaging tools, mailbox clients, and social platform software may be installed on the terminal devices 103 and 104.

The terminal devices 103 and 104 may be various electronic devices, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 101 may be a server providing various services, for example, a backend server that provides support for applications on the terminal devices 103 and 104. The backend server may perform a processing including analyzing data such as a patch acquiring request and return the processing result (e.g., a patch file) to the terminal devices.

It should be noted that the method for generating a patch according to the embodiments of the present disclosure is generally executed by the server 101. Accordingly, an apparatus for generating a patch is generally installed on the server 101.

It should be appreciated that the numbers of the terminal devices, the networks, the servers and the database servers in FIG. 1 are merely illustrative. Any number of terminal devices, networks, servers and database servers may be provided based on the actual requirements.

In some application scenarios, the system architecture 100 may also exclude the terminal device and the network. The patch file may also be used for a process of the server, or a process of another server.

Figure 2:
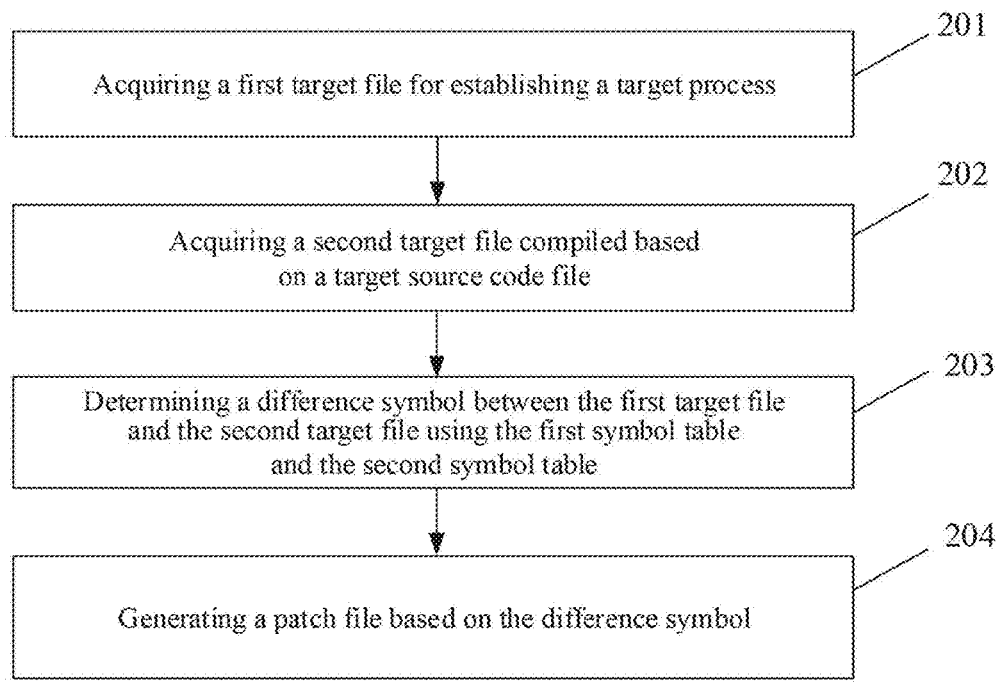
FIG. 2 is a flowchart of an embodiment of a method for generating a patch according to the disclosure.

Please further refer to FIG. 2, FIG. 2 shows a flow 200 of an embodiment of a method for generating a patch according to the disclosure. The method for generating a patch includes the following steps.

Step 201: acquiring a first target file for establishing a target process.

In the embodiment, an electronic device (e.g., the server shown in FIG. 1) in which the method for generating a patch is performed may acquire a first target file for establishing a target process locally or from another electronic device.

Figure 3:
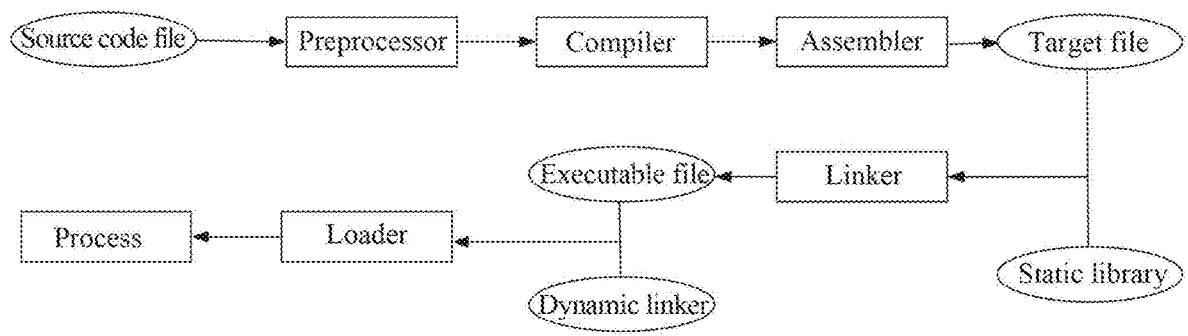
FIG. 3 is a schematic diagram of a procedure of establishing a process according to some embodiments.

It should be noted that FIG. 3 shows a procedure of establishing a process under a normal condition. The courses from a source code file to an executable file, and then to a process are mainly implemented by following processing modules: a pre-processor, a compiler, a linker, a loader, and a dynamic connector. A static library is also required during processing.

In the embodiment, a file generated after the compiler compiles a source code is called as a target file. The target file is structurally a compiled executable file, but is not linked. Some of symbols or addresses in the target file are not adjusted. In fact, the target file itself may be stored in an executable file format. The target file may include compiled machine instruction codes and data. The target file may further include some information required for linking, such as a symbol table, debugging information, a string table, or a relocation table.

It should be noted that the target process may be a specified process, while the target file is a specific file generated in a compilation process in the computer field.

In some optional implementations of the embodiment, the target process may be a process awaiting update. The target process may be updated using the patch file. The process update may also be known as the process upgrade. As an example, the target process may be a user-state process of a virtual machine.

Optionally, an address space of an old version process (target process) may be modified to obtain a new version process. In this procedure, the process is interrupted for a short period, enabling the process to be upgraded when interrupt of the implemented function is not perceived. It should be noted that the device establishing the target process may be identical to or different from the electronic device.

In the embodiment, if the target process is obtained by processing the target file via a linker, a loader, and a dynamic connector, then the target file may be referred to as the target file for establishing the target process. The "first" in the first target file is intended to distinguish the target file for establishing the target process from the target file represented by the second target file below.

In the embodiment, the first target file may include the first symbol table.

In the embodiment, the symbol table may be a segment in the target file. Usually, the target file has a corresponding symbol table. The table records all symbols used in the target file. The symbol table may record symbol names and symbol values. Function names and variable names are symbol names. If the symbol is the definition of a function or a variable, then the symbol value may be the address of the function or the variable.

In some optional implementations of the embodiment, the first target file may be obtained by compiling a source code file of an old version. It should be noted that the first target file corresponding to the target process was compiled before executing the step 201.

Step 202: acquiring a second target file compiled based on a target source code file.

In the embodiment, the electronic device may acquire a second target file compiled based on a target source code file.

In some optional implementations of the embodiment, the target source code file may be a source code file of a new version obtained by adapting the source code file of the old version.

In the embodiment, the second target file includes a second symbol table. The second symbol table may record symbols used in the second target file.

In the embodiment, the second target file may be compiled by the electronic device before the step 202, or compiled by the other electronic device. The electronic device may acquire the second target file locally or from the other electronic device.

Step 203: determining a difference symbol between the first target file and the second target file using the first symbol table and the second symbol table.

In the embodiment, the electronic device may determine a difference symbol between the first target file and the second target file using the first symbol table and the second symbol table.

In the embodiment, the difference symbol may be a symbol enabling a symbol set of the first target file to be different from a symbol set of the second target file. As an example, the difference may be caused by increase, decrease or modification of symbols in the second target file relative to symbols in the first target file.

In some optional implementations of the embodiment, the step 203 may be implemented by following: comparing the first symbol table with the second symbol table to determine the difference symbol.

Step 204: generating a patch file based on the difference symbol.

In the embodiment, the electronic device may generate a patch file based on the difference symbol.

In the embodiment, the patch file may be a file for updating a process. Optionally, the target process may be updated by the electronic device or the other electronic device after generating the patch file in the step 204.

In some optional implementations of the embodiment, the step 204 may be implemented by following: acquiring a symbol content of the difference symbol and/or a relocation item of the difference symbol. A symbol name of the difference symbol and at least one of: the symbol content or the relocation item, are stored into a pre-generated file.

It should be noted that the pre-generated file may be an empty file. After the symbol name of the difference symbol and at least one of: the symbol content or the relocation item, are stored into the empty file, a patch file may be obtained.

Optionally, the symbol content may be a function body or a variable value.

Optionally, the relocation item of a symbol may be used for recording relevant information required for relocating the symbol. As an example, the relocation item may be used for recording location information required for relocation.

In some optional implementations of the embodiment, the patch file may include a data section, a relocation section, and a symbol table section. Here, the patch file may be an executable file. The data section, relocation section, and the symbol table section may be predefined components of the patch file, and may be similar to: a cabinet including a first layer and a second layer, the cabinet being equivalent to the patch file, the first layer being equivalent to the data section, and so on.

In some optional implementations of the embodiment, the storing the symbol name of the difference symbol and at least one of: the symbol content or the relocation item, into the pre-generated file may be implemented by following: storing the relocation item into the relocation section, storing the symbol content into the data section, where the symbol content in the data section can be indexed to the relocation item stored in the relocation section; and storing the symbol name into the symbol table section, where the symbol name stored into the symbol table section can be indexed to the symbol content sored in the data section.

The method provided by the above embodiments of the disclosure acquires a first target file for establishing a target process, the first target file including a first symbol table; acquires a second target file compiled based on a target source code file, the second target file including a second symbol table; determines a difference symbol between the first target file and the second target file using the first symbol table and the second symbol table; and generates a patch file based on the difference symbol, thereby enriching the way to generate a patch file.

In some optional implementations of the embodiment, the symbol type of a symbol includes a read-only type and a read-write type.

Figure 4:
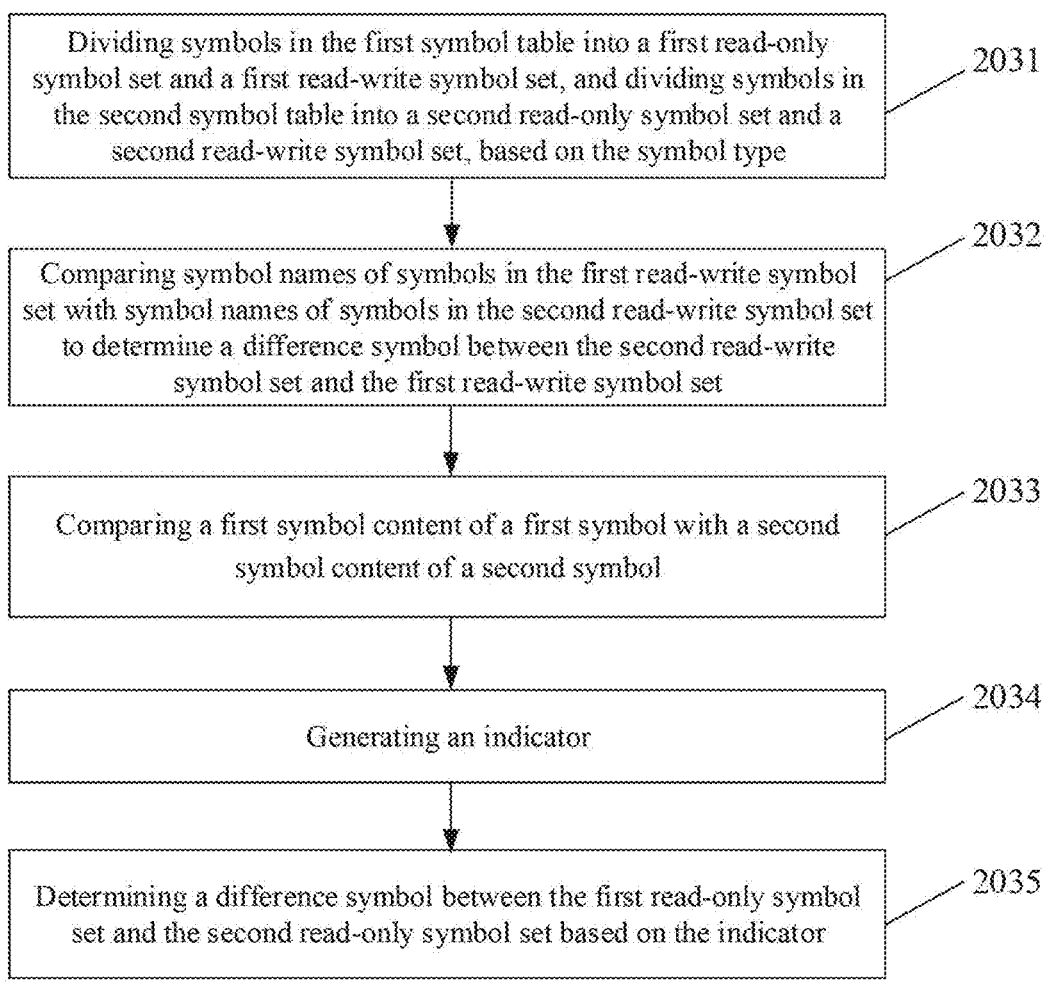
FIG. 4 is a flowchart of an implementation of step 203 according to some embodiments.

In some optional implementations of the embodiment, please refer to FIG. 4, FIG. 4 shows a flow 203. The flow 203 may be implemented as follows.

Step 2031: dividing symbols in the first symbol table into a first read-only symbol set and a first read-write symbol set, and dividing symbols in the second symbol table into a second read-only symbol set and a second read-write symbol set, based on the symbol type.

Optionally, the symbol of the read-only type may be a symbol that may not change when a program is running, e.g., a function and a read-only character string. The symbol of the read-write type may be a symbol that may change when a program is running, e.g., a global variable and a static variable.

Step 2032: comparing symbol names of symbols in the first read-write symbol set with symbol names of symbols in the second read-write symbol set, and determining a difference symbol between the second read-write symbol set and the first read-write symbol set.

It should be noted that for a read-write symbol, the symbol content is not constant when a program is running. Therefore, the difference symbol cannot be accurately determined by comparing the symbol content, which may increase calculation resources on the contrary. Therefore, addition or deletion may be determined directly based on the symbol name.

Step 2033: comparing a first symbol content of a first symbol with a second symbol content of a second symbol.

In the implementation, the first symbol is a symbol in the first read-only symbol set, and the second symbol is a symbol, in the second read-only symbol set, corresponding to the first symbol.

It should be noted that the first target file is obtained by compiling the source code file of the old version, while the second target file is obtained by compiling the source code file of the new version. When the source code file is improved from the old version to the new version, the main part and naming method of the source code file usually may not greatly change. Therefore, parts having correspondence in the first target file and the second target file may be determined in a variety of ways (e.g., position contrast or finding the same name).

Optionally, the step 2033 may be implemented by following: determining, for bytes requiring relocation in the first symbol content and the second symbol content, whether the relocation is of the same type and whether symbols used for the relocation are identical; and determining, for bytes with no need for relocation in the first symbol content and the second symbol content, whether the bytes with no need for relocation are identical.

It should be noted that the bytes with no need for relocation may be compared directly. The bytes requiring relocation may be compared based on the type of the relocation and the symbol used for the relocation.

It should be noted that, the symbol content of a symbol is indicated to be unchanged only when the bytes requiring relocation and the bytes with no need for relocation are completely identical. Otherwise, the symbol may be added, deleted or modified.

Step 2034: generating an indicator.

In the implementation, the indicator is a non-difference indicator or a difference type indicator, the non-difference indicator is used for indicating the first symbol content being identical to the second symbol content, the difference type indicator is used for indicating a type of difference between the second symbol content and the first symbol content, and the type of difference includes addition, deletion and modification.

Step 2035: determining a difference symbol between the first read-only symbol set and the second read-only symbol set based on the indicator.

The difference symbol between the first target file and the second target file may be obtained by summarizing the difference symbol obtained in the step 2032 and the difference symbol obtained in the step 2035.

Figure 5:
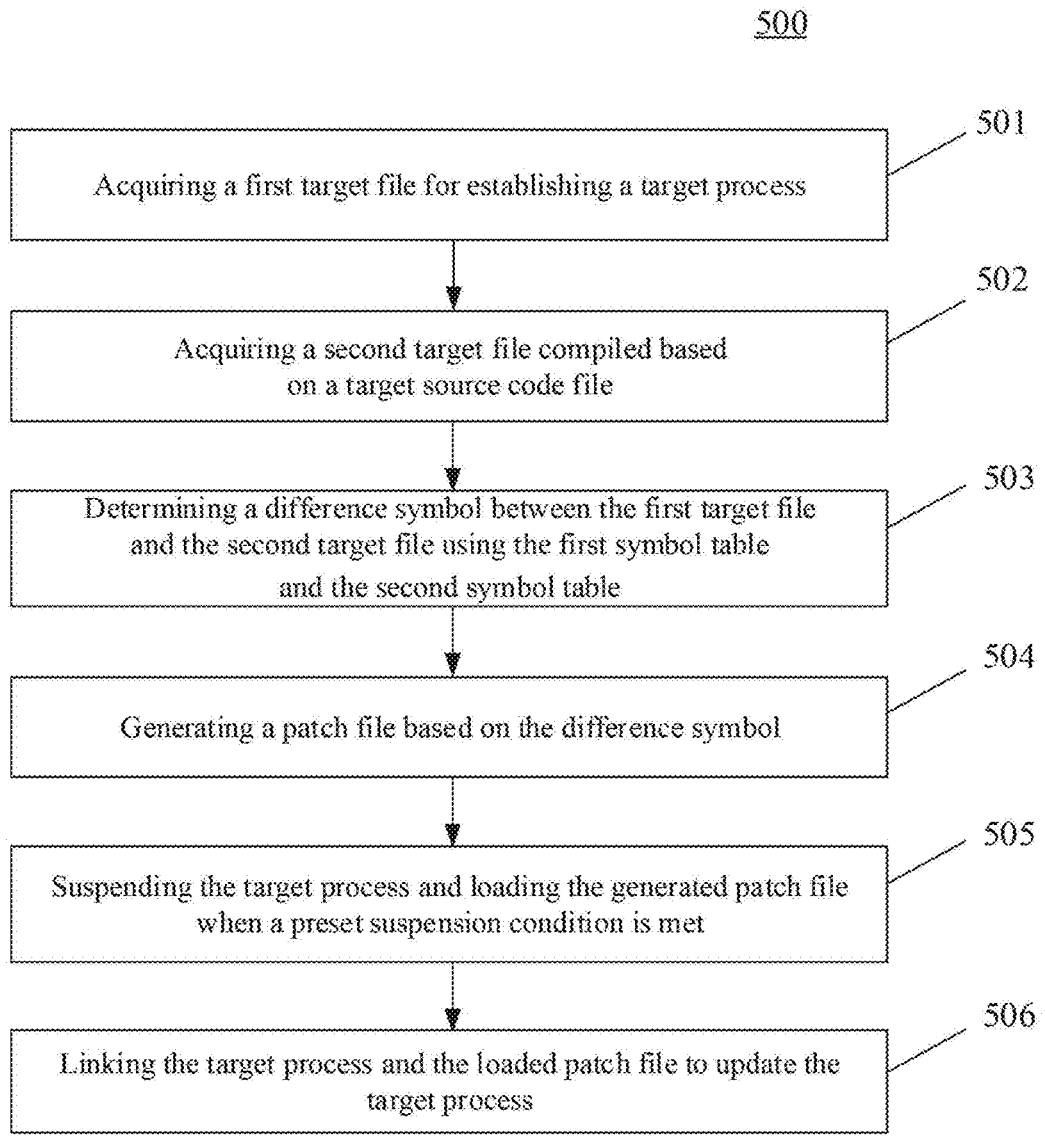
FIG. 5 is a flowchart of another embodiment of a method for generating a patch according to the disclosure.

Please further refer to FIG. 5, FIG. 5 shows a flow 500 of another embodiment of a method for generating a patch. The flow 500 of the method for generating a patch includes the following steps.

Step 501: acquiring a first target file for establishing a target process.

In the embodiment, an electronic device (e.g., the server shown in FIG. 1) in which the method for generating a patch is performed may acquire a first target file for establishing a target process.

Step 502: acquiring a second target file compiled based on a target source code file.

In the embodiment, the electronic device may acquire a second target file compiled based on a target source code file.

Step 503: determining a difference symbol between the first target file and the second target file using the first symbol table and the second symbol table.

In the embodiment, the electronic device may determine a difference symbol between the first target file and the second target file using the first symbol table and the second symbol table.

Step 504: generating a patch file based on the difference symbol.

In the embodiment, the electronic device may generate a patch file based on the difference symbol.

It should be noted that the descriptions on the steps 201, 202, 203, and 204 may be referred to for the implementation details and technical effects of the steps 501, 502, 503, and 504, which are not repeatedly described any more here.

In some optional implementations of the embodiment, the symbol includes a function. Before step 505, the embodiment may further include: acquiring a current function call chain of the target process; determining whether a function included in the function call chain and a function in the patch file have an intersection based on function names; and determining a preset suspension condition being met if the function included in the function call chain and the function in the patch file have no intersection.

It should be noted that, if the function included in the function call chain and the function in the patch file have the intersection, and a function of the intersection between the two is modified during the call, then a lot of uncertainties may be caused. For example, a function before update may contain a main loop, so the target process may not exit the function before the update, and then patching is meaningless in this case. The formal parameter count of the function before the update may be different from the formal parameter count of the updated function. Patching in this case may cause the target process to crash.

Optionally, the function call chain may be obtained in a variety of ways. For example, the whole call chain may be obtained using a call chain view interface provided by the system. The function call chain may also be obtained by obtaining stack frames through traversing from the stack top of the process to the stack bottom of the process.

Optionally, execution of the target process may be suspended regularly, and the current function call chain may be traced back for comparison with the function in the patch. When there is not any intersection between both, loading and linking the patch are started.

Step 505: suspending the target process and loading the generated patch file when a preset suspension condition is met.

In the embodiment, the electronic device may suspend the target process and load the generated patch file when the preset suspension condition is met.

In the embodiment, the target process may be a process awaiting update, and obtained from a source code file of an old version. The target source code file may be a source code file of a new version obtained by adapting a source code file of an old version.

In some optional implementations of the embodiment, to-be-executed instructions in a code segment of the target process may be backed up after suspending the target process. Then, an address space is assigned for the patch file in the target process. Then, a function, a character string, and a variable in the patch are copied to the address space assigned just now.

Optionally, the suspending the target process and the loading the patch file may be implemented in a variety of ways. As an example, the suspending the target process and the loading the patch file may be implemented using a system interface having corresponding functions provided by the system.

Step 506: linking the target process and the loaded patch file to update the target process.

In the embodiment, the electronic device may link the target process and the loaded patch file to update the target process.

In the embodiment, when linking the loaded patch file and the target process, three types of data may need to be modified as follows: a function or a variable in the patch, where the function or the variable in the patch may need to be accessed; the function or the variable in the patch, where an existing function or an existing variable in the target process may need to be accessed; and an existing function or an existing variable in an old process, where the function or the variable in the patch may need to be accessed.

Here, the third situation needs to be specially considered: the target process is not likely to have an access to a newly added variable in the patch. A function calling the newly added variable must be a function that has changed, and therefore has been included in the patch. The target process may have an access to a modified function in the patch. In this case, an indirect access method is used, i.e., modifying a first instruction of the function having the same name in the target process to jump to a function in the patch.

It should be noted that, the linking method not only simplifies the linking procedure, but also has following advantages: the target process may store a function pointer using a variable, and then call the function using the function pointer. If the called function has an error, then calling an old function by a function pointer can only be avoided by modifying the first instruction of the old function and allowing it to jump to a new function in the patch.

In some optional implementations of the embodiment, linking between the target process and the loaded patch file may be implemented using a variety of linking methods. For example, here dynamic linking may be used for linking a memory.

As an example, the loaded patch file is linked to two types of symbols: a symbol defined within a process (when the target process and the loading address of the patch file are determined, the address of the symbol here is determined), and a symbol defined in a shared library (calculated during the target process initialization).

After calculating an absolute address of the symbol in the shared library, the loaded patch file may be linked to an address of a variable to be stored into a global offset table (GOT) of the target process; and the loaded patch file may be linked to a procedure linkage table (PLT) of the target process, and then jump from the PLT to an address of a corresponding function stored in the GOT.

In some optional implementations of the embodiment, before the step 506, the embodiment may further include: modifying a relative address of a symbol in the first symbol table to an absolute address based on an absolute address of the target process in the address space.

It should be noted that, a position independent program may be patched using a symbol table recording absolute addresses.

In some optional implementations of the embodiment, the step 506 may include: linking the function in the patch file to a function or a variable in the target process based on the modified first symbol table.

It should be noted that for symbols of a static type, the same name may exist in different target subfiles, and an expected symbol may not be determined uniquely in a plurality of target subfiles of the target file based on the symbol name.

In some optional implementations of the embodiment, the second target file includes at least two second target subfiles. The embodiment may further include: generating, for each second target subfile, a symbol name set corresponding to the second target subfile, the symbol name set including a symbol name of a static symbol in the second target subfile.

It should be noted that, the generated symbol name set corresponding to the second target subfile is indicated by a mark to correspond to the second target subfile. During generating the target file, a plurality of target subfiles of an executable file may be distinguished by adding a separator. Accordingly, second target files and a symbol name set corresponding to a mark may be defined.

As an example, a second target subfile A includes a static variable A and a static variable B, and then a symbol name set {the static variable A, the static variable B} corresponding to the second target subfile A may be generated. As an example, a second target subfile B includes the static variable A and a static variable C, and then a symbol name set {the static variable A, the static variable C} corresponding to the second target subfile B may be generated. A patch file includes the static variable A, and the static variable A in the patch file is indicated by a mark to belong to the second target subfile A.

In some optional implementations of the embodiment, the first target file includes at least two first target subfiles. The step 506 may include: finding, for a target symbol of a static type in the patch file, a first target subfile corresponding to the second target subfile including the target symbol based on the symbol name set corresponding to the second target subfile including the target symbol; and finding the symbol corresponding to the target symbol in the found first target subfile.

As an example, a first target subfile A includes a static variable A and a static variable B, and then a symbol name set {the static variable A, the static variable B} corresponding to the first target subfile A may be generated. As an example, a first target subfile B includes the static variable A and a static variable C, and then a symbol name set {the static variable A, the static variable C} corresponding to the first target subfile B may be generated.

For the static variable A in the patch file, the first target subfile A corresponding to the second target subfile A may be found based on the static variable A and the symbol name set {the static variable A, the static variable B} corresponding to the second target subfile A. Then, the static variable A of a symbol in the first target subfile A corresponding to the target symbol is found in the found first target subfile.

In some optional implementations of the embodiment, after the step 506, the embodiment may further include: updating, after updating the target process, the first symbol table based on a symbol in the updated target process.

It should be noted that, a new symbol table may be generated after patching, so the new symbol table may be used during next patching, thereby supporting multiple patching.

As can be seen from FIG. 5, compared with the embodiment corresponding to FIG. 2, the flow 500 of the method for generating a patch according to the embodiment highlights linking a loaded patch, and directly modifying the address space of the target process to update the target process, thereby implementing process update.

Figure 6:
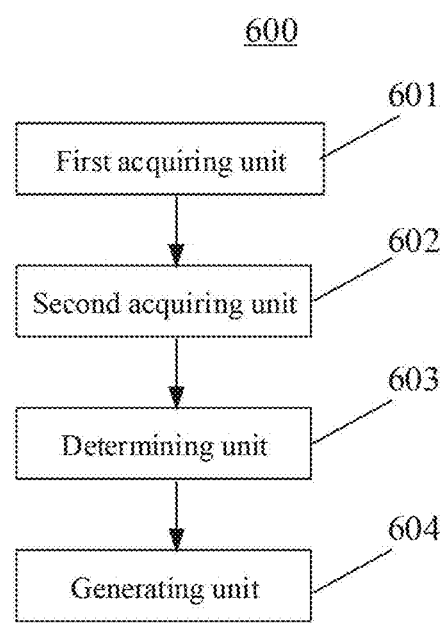
FIG. 6 is a structural schematic diagram of an embodiment of an apparatus for generating a patch according to the disclosure.

Please further refer to FIG. 6. As an implementation of the method shown in the above figures, the disclosure provides an embodiment of an apparatus for generating a patch. The embodiment of the apparatus corresponds to the embodiment of the method shown in FIG. 2, and the apparatus may be specifically applied to a variety of electronic devices.

As shown in FIG. 6, the apparatus 600 for generating a patch according to the embodiment includes: a first acquiring unit 601, a second acquiring unit 602, a determining unit 603 and a generating unit 604. The first acquiring unit is used for acquiring a first target file for establishing a target process, the first target file including a first symbol table; the second acquiring unit is used for acquiring a second target file compiled based on a target source code file, the second target file including a second symbol table; the determining unit is used for determining a difference symbol between the first target file and the second target file using the first symbol table and the second symbol table; and the generating unit is used for generating a patch file based on the difference symbol.

Relevant descriptions on the steps 201, 202, 203 and 204 in the embodiment corresponding to FIG. 2 may be respectively referred to for specific processing of the first acquiring unit 601, the second acquiring unit 602, the determining unit 603 and the generating unit 604 according to the embodiment and technical effects brought thereby, which are not repeatedly described any more here.

In some optional implementations of the embodiment, a symbol type of a symbol includes a read-only type and a read-write type; and the determining unit is further used for: dividing symbols in the first symbol table into a first read-only symbol set and a first read-write symbol set, and dividing symbols in the second symbol table into a second read-only symbol set and a second read-write symbol set, based on the symbol type.

In some optional implementations of the embodiment, the determining unit is further used for: comparing symbol names of the symbols in the first read-write symbol set with symbol names of the symbols in the second read-write symbol set to determine a difference symbol between the second read-write symbol set and the first read-write symbol set.

In some optional implementations of the embodiment, the determining unit is further used for: comparing a first symbol content of a first symbol with a second symbol content of a second symbol, where the first symbol is a symbol in the first read-only symbol set, and the second symbol is a symbol corresponding to the first symbol in the second read-only symbol set; and generating an indicator, where the indicator is a non-difference indicator or a difference type indicator, the non-difference indicator is used for indicating the first symbol content being identical to the second symbol content, the difference type indicator is used for indicating a type of difference between the second symbol content and the first symbol content, and the type of difference includes addition, deletion and modification.

In some optional implementations of the embodiment, the determining unit is further used for: determining, for bytes requiring relocation in the first symbol content and the second symbol content, whether the relocation is of a same type and whether symbols used for the relocation are identical; and determining, for bytes with no need for relocation in the first symbol content and the second symbol content, whether the bytes with no need for relocation are identical.

In some optional implementations of the embodiment, the determining unit is further used for: determining a difference symbol between the first read-only symbol set and the second read-only symbol set based on the indicator.

In some optional implementations of the embodiment, the generating unit is further used for: acquiring a symbol content of the difference symbol and/or a relocation item of the difference symbol; and storing a symbol name of the difference symbol and at least one of: the symbol content or the relocation item, into a pre-generated file.

In some optional implementations of the embodiment, the patch file includes: a data section, a relocation section, and a symbol table section; and the generating unit is further used for: storing the relocation item into the relocation section; storing the symbol content into the data section, where the symbol content in the data section can be indexed to the relocation item stored in the relocation section; and storing the symbol name into the symbol table section, where the symbol name stored into the symbol table section can be indexed to the symbol content stored in the data section.

In some optional implementations of the embodiment, the apparatus further includes: a loading unit (not shown), for suspending the target process and loading the generated patch file when a preset suspension condition is met; a linking unit (not shown), further used for: linking the target process and the loaded patch file to update the target process.

In some optional implementations of the embodiment, the symbol includes a function; and the apparatus further includes: a third acquiring unit (not shown), for acquiring a current function call chain of the target process; an intersection determining unit (not shown), for: determining whether a function included in the function call chain and a function in the patch file have an intersection based on function names; and a condition determining unit (not shown), for: determining the preset suspension condition being met if the function included in the function call chain and the function in the patch file have no intersection.

In some optional implementations of the embodiment, before the linking the target process and the loaded patch file to update the target process, the apparatus further includes: a modifying unit, for: modifying a relative address of a symbol in the first symbol table to an absolute address based on an absolute address of the target process in an address space.

In some optional implementations of the embodiment, the linking unit is further used for: linking the function in the patch file to a function or a variable in the target process based on the modified first symbol table.

In some optional implementations of the embodiment, the second target file includes at least two second target subfiles; and the apparatus further includes: a set generating unit (not shown), for: generating, for each of the second target subfiles, a symbol name set corresponding to the second target subfile, the symbol name set including a symbol name of a static symbol in the second target subfile.

In some optional implementations of the embodiment, the first target file includes at least two first target subfiles; and the linking unit is further used for: finding, for a target symbol of a static type in the patch file, a first target subfile corresponding to the second target subfile including the target symbol based on the symbol name set corresponding to the second target subfile of the target symbol; and finding a symbol corresponding to the target symbol in the found first target subfile.

In some optional implementations of the embodiment, the apparatus further includes: an updating unit, for: updating, after updating the target process, the first symbol table based on a symbol in the updated target process.

It should be noted that the descriptions of other embodiments in the disclosure may be referred to for the implementation details and technical effects of the units in the apparatus for generating a patch according to the embodiment, which are not repeated any more here.

Figure 7:
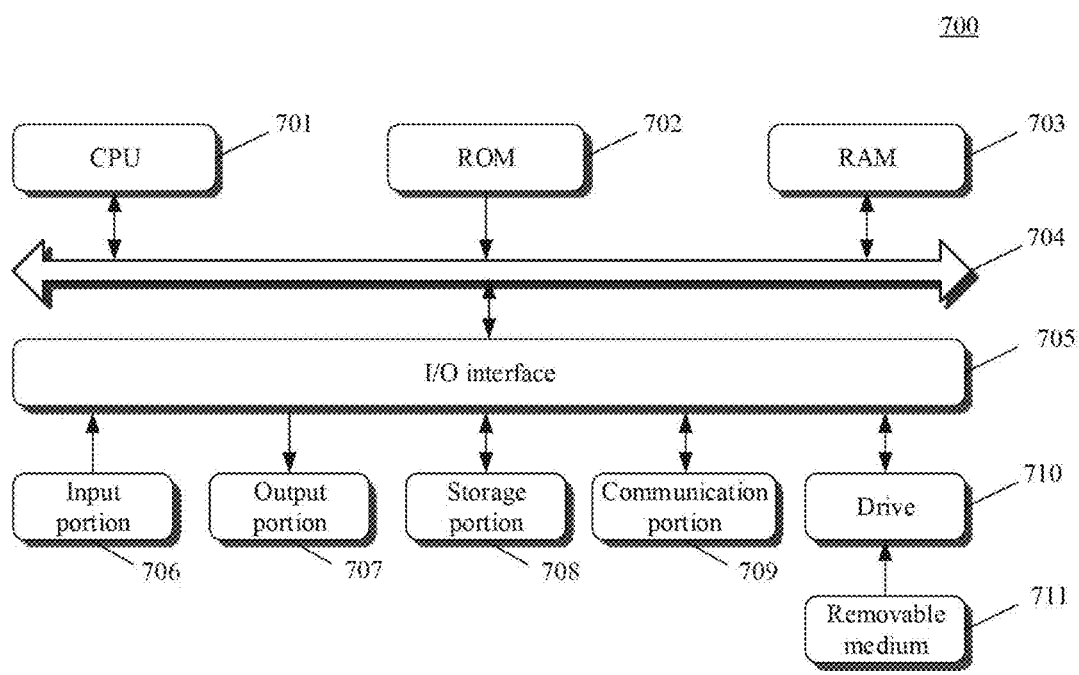
FIG. 7 is a structural schematic diagram of a computer system adapted to implement an electronic device according to an embodiment of the disclosure.

Referring to FIG. 7, a schematic structural diagram of a computer system 700 adapted to implement an electronic device of the embodiments of the present disclosure is shown. The electronic device shown in FIG. 7 is merely an example, and should not bring any limitations to the functions and the scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of some embodiments of the present disclosure.

It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a first acquiring unit, a second acquiring unit, a determining unit and a generating unit, where the names of these units do not in some cases constitute a limitation to such units themselves. For example, the first acquiring unit may also be described as "a unit for acquiring a first target file for establishing a target process".

In another aspect, some embodiments of the present disclosure further provide a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by an apparatus, cause the apparatus to: acquiring a first target file for establishing a target process, the first target file comprising a first symbol table; acquiring a second target file compiled based on a target source code file, the second target file comprising a second symbol table; determining a difference symbol between the first target file and the second target file using the first symbol table and the second symbol table; and generating a patch file based on the difference symbol.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating a patch file performed by at least one processor, comprising:
    acquiring a first target the for establishing a target process, the first target file comprising a first symbol table, the first target file being obtained by compiling a source code file of an old version;
    acquiring a second target file obtained by compiling a source code file of a new version, the second target file comprising a second symbol table, the source code file of the new version being obtained by modifying the source code file of the old version;
    determining a difference symbol between the first target file and the second target file using the first symbol table and the second symbol table;
    wherein a symbol type of a symbol comprises a read-only type and a read-write type, the symbol of the read-only type comprises at least one of: a global variable or a static variable;
    the determining the difference symbol between the first target file and the second target file using the first symbol table and the second symbol table comprises:
        dividing symbols in the first symbol table into a first read-only symbol set and a first read-write symbol set, and dividing symbols in the second symbol table into a second read-only symbol set and a second read-write symbol set, based on the symbol type; and
        comparing symbol names of symbols in the first read-write symbol set with symbol names of symbols in the second read-write symbol set to determine a difference symbol between the second read-write symbol set and the first read-write symbol set;
    generating a patch file based on the difference symbol; and
    suspending the target process and loading the generated patch file in response to determining that a preset suspension condition is met, the loading comprising: backing up to-be-executed instructions in a code segment of the target process after suspending the target process, assigning an address space for the patch file in the target process, and copying a function, a character string, and a variable in the patch file to the address space.

2. The method according to claim 1, wherein the determining the difference symbol between the first target file and the second target file using the first symbol table and the second symbol table further comprises:
comparing a first symbol content of a first symbol with a second symbol content of a second symbol, wherein the first symbol is a symbol in the first read-only symbol set, and the second symbol is a symbol corresponding to the first symbol in the second read-only symbol set; and
generating an indicator; wherein the indicator is a non-difference indicator or a difference type indicator, the non-difference indicator is used for indicating the first symbol content being identical to the second symbol content, the difference type indicator is used for indicating a type of difference between the second symbol content and the first symbol content, and the type of difference comprises addition, deletion and modification.

3. The method according to claim 2, wherein the comparing the first symbol content of the first symbol with the second symbol content of the second symbol comprises:
determining whether relocation required by bytes in the first symbol content and the second symbol content is of a same type and whether symbols used for the relocation required by the bytes in the first symbol content and the second symbol content are identical; and
determining whether bytes with no need for relocation in the first symbol content and the second symbol content are identical.

4. The method according to claim 3, wherein the determining the difference symbol between the first target file and the second target file using the first symbol table and the second symbol table comprises:
determining a difference symbol between the first read-only symbol set and the second read-only symbol set based on the indicator.

5. The method according to claim 3, wherein the generating the patch file based on the difference symbol comprises:
acquiring a symbol content of the difference symbol and/or a relocation item of the difference symbol;
storing a symbol name of the difference symbol and at least one of: the symbol content or the relocation item, into a pre-generated file.

6. The device according to claim 5, wherein the patch file comprises: a data section, a relocation section, and a symbol table section; and
the storing the symbol name of the difference symbol and at least one of: the symbol content or the relocation item, into a pre-generated file comprises:
storing the relocation item into the relocation section;
storing the symbol content into the data section, wherein the symbol content in the data section can be indexed to the relocation item stored in the relocation section; and
storing the symbol name into the symbol table section, wherein the symbol name stored in the symbol table section can be indexed to the symbol content stored in the data section.

7. The method according to claim 1, further comprising:
linking the target process and the loaded patch file to update the target process.

8. The method according to claim 7, wherein the symbol comprises a function; and
the method further comprises:
acquiring a current function call chain of the target process;
determining whether a function included in the function call chain and a function in the patch file includes an intersection based on function names; and
determining the preset suspension condition being met in response to determining that the function included in the function call chain and the function in the patch file includes no intersection.

9. The method according to claim 8, wherein before the linking the target process and the loaded patch file to update the target process, the method further comprises:
modifying a relative address of a symbol in the first symbol table to an absolute address based on an absolute address of the target process in an address space.

10. The method according to claim 9, wherein the linking the target process and the loaded patch file to update the target process comprises:
linking the function in the patch file to a function or a variable in the target process based on the modified first symbol table.

11. The method according to claim 10, wherein the second target the comprises at least two second target subfiles; and
the method further comprises:
generating, for each second target subfile of the at least two second target subfiles, a symbol name set corresponding to the second target subfile, the symbol name set including a symbol name of a static symbol in the second target subfile.

12. The method according to claim 11, wherein the first target file comprises at least two first target subfiles; and
the linking the function in the patch file to a function or a variable in the target process based on the modified first symbol table comprises:
finding, for a target symbol of a static type in the patch file, a first target subfile corresponding to the second target subfile including the target symbol based on the symbol name set corresponding to the second target subfile of the target symbol; and
finding a symbol corresponding to the target symbol in the found first target subfile.

13. The method according to claim 12, wherein after the linking the target process and the loaded patch file to update the target process, the method further comprises:
updating the first symbol table based on a symbol in the updated target process.

14. An apparatus for generating a patch file, comprising:
at least one processor; and
a memory storing instructions, the instructions when executed by the at least one processor, cause the at least one processor to perform operations, the operations comprising:
acquiring a first target the for establishing a target process, the first target file comprising a first symbol table, the first target the being obtained by compiling a source code file of an old version;
acquiring a second target file obtained by compiling a source code file of a new version, the second target file comprising a second symbol table, the source code file of the new version being obtained by modifying the source code file of the old version;

determining a difference symbol between the first target file and the second target file using the first symbol table and the second symbol table;

wherein a symbol type of a symbol comprises a read-only type and a read-write type, the symbol of the read-only type comprises at least one of: a global variable or a static variable;

the determining the difference symbol between the first target file and the second target file using the first symbol table and the second symbol table comprises:
dividing symbols in the first symbol table into a first read-only symbol set and a first read-write symbol set, and dividing symbols in the second symbol table into a second read-only symbol set and a second read-write symbol set, based on the symbol type; and
comparing symbol names of symbols in the first read-write symbol set with symbol names of symbols in the second read-write symbol set to determine a difference symbol between the second read-write symbol set and the first read-write symbol set;

generating a patch the based on the difference symbol; and suspending the largest process and loading the generated patch file in response to determining that a preset suspension condition is met, the loading comprising: backing up to-be-executed instructions in a code segment of the target process after suspending the target process, assigning an address space for the patch file in the target process, and copying a function, a character string, and a variable in the patch file to the address space.

15. A non-transitory computer storage medium storing a computer program, the computer program when executed by one or more processors, causes the one or more processors to perform operations, the operations comprising:

acquiring a first target file for establishing a target process, the first target file comprising a first symbol table, the first target file being obtained by compiling a source code file of an old version;

acquiring a second target file obtained by compiling a source code file of a new version, the second target file comprising a second symbol table, the source code file of a new version being obtained by modifying the source code file of the old version;

determining a difference symbol between the first target file and the second target file using the first symbol table and the second symbol table;

wherein a symbol type of a symbol comprises a read-only type and a read-write type, the symbol of the read-only type comprises at least one of: a global variable or a static variable;

the determining the difference symbol between the first target file and the second target file using the first symbol table and the second symbol table comprises:
dividing symbols in the first symbol table into a first read-only symbol set and a first read-write symbol set, and dividing symbols in the second symbol table into a second read-only symbol set and a second read-write symbol set, based on the symbol type; and
comparing symbol names of symbols in the first read-write symbol set with symbol names of symbols in the second read-write symbol set to determine a difference symbol between the second read-write symbol set and the first read-write symbol set;

generating a patch file based on the difference symbol; and suspending the target process and loading the generated patch file in response to determining that a preset suspension condition is met, the loading comprising: backing up to-be-executed instructions in a code segment of the target process after suspending the target process, assigning an address space for the patch file in the target process, and copying a function, a character string, and a variable in the patch file to the address space.

* * * * *

UNITED STATES PATENT AND TRADEMARK OFFICE
CERTIFICATE OF CORRECTION

PATENT NO. : 11,169,792 B2  
APPLICATION NO. : 16/133436  
DATED : November 9, 2021  
INVENTOR(S) : Liu et al.

Page 1 of 1

It is certified that error appears in the above-identified patent and that said Letters Patent is hereby corrected as shown below:

In the Claims

In Column 14, Line 32, Claim 1, delete "the" and insert --file--.

In Column 15, Line 16 (approx.), Claim 2, delete "indicator;" and insert --indicator,--.

In Column 15, Line 53, Claim 6, delete "device" and insert --method--.

In Column 16, Line 29, Claim 11, delete "the" and insert --file--.

In Column 16, Line 59, Claim 14, delete "the" and insert --file--.

In Column 16, Line 61, Claim 14, delete "the" and insert --file--.

In Column 17, Line 21, Claim 14, delete "the" and insert --file--.

In Column 17, Line 22, Claim 14, delete "largest" and insert --target--.

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*